United States Patent
Ehrlich et al.

(10) Patent No.: US 8,936,265 B2
(45) Date of Patent: Jan. 20, 2015

(54) REAR AXLE FOR A MOTOR VEHICLE

(71) Applicant: GM Global Technology Operations LLC, Detroit, MI (US)

(72) Inventors: Dirk Ehrlich, Bodenheim (DE); Michael Harder, Bodenheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/923,178

(22) Filed: Jun. 20, 2013

(65) Prior Publication Data

US 2013/0341882 A1  Dec. 26, 2013

(30) Foreign Application Priority Data

Jun. 25, 2012  (DE) .......................... 10 2012 012 652

(51) Int. Cl.
 *B60G 3/10*  (2006.01)
 *B60G 11/08* (2006.01)
 *B60G 3/00*  (2006.01)
 *B60G 3/20*  (2006.01)

(52) U.S. Cl.
 CPC B60G 11/08 (2013.01); B60G 3/00 (2013.01); B60G 3/202 (2013.01); B60G 2202/114 (2013.01); B60G 2204/121 (2013.01)
 USPC ............. 280/124.171; 267/246; 280/124.128; 280/124.148; 280/124.153

(58) Field of Classification Search
 USPC ........................................ 267/192, 193, 246; 280/124.106–124.108, 124.114, 280/124.116, 124.117, 124.128, 124.131, 280/124.135, 124.143, 124.145, 124.148, 280/124.153, 124.154, 124.156, 124.165, 280/124.171–124.173, 124.175, 124.176
 See application file for complete search history.

(56) References Cited

U.S. PATENT DOCUMENTS

| 869,583 | A | * | 10/1907 | Macfarren | 280/6.16 |
|---|---|---|---|---|---|
| 1,564,653 | A | * | 12/1925 | Weaver | 280/124.136 |
| 1,564,733 | A | * | 12/1925 | Weaver | 180/362 |
| 1,731,962 | A | * | 10/1929 | Wright | 180/362 |
| 1,884,474 | A | * | 10/1932 | Wolforth | 180/254 |
| 2,039,983 | A | * | 5/1936 | Schlirf | 267/246 |
| 2,153,233 | A | * | 4/1939 | Best | 280/124.153 |
| 2,592,893 | A | * | 4/1952 | Hansen | 180/362 |
| 3,181,641 | A | * | 5/1965 | Haddad | 180/256 |

(Continued)

FOREIGN PATENT DOCUMENTS

| DE | 3105383 A1 | 9/1982 |
|---|---|---|
| DE | 102008049761 A1 | 4/2010 |

(Continued)

OTHER PUBLICATIONS

German Patent Office, German Search Report for Application No. 102012012652.2, dated Mar. 21, 2013.

*Primary Examiner* — Paul N Dickson
*Assistant Examiner* — Laura Freedman
(74) *Attorney, Agent, or Firm* — Ingrassia Fisher & Lorenz, P.C.

(57) ABSTRACT

A rear axle is provided for a motor vehicle, in particular a passenger car, with two independent wheel suspensions, each of which include, but is not limited to a wheel carrier and a three-link arrangement connected therewith in an articulated manner with a longitudinal link and two transverse links. The two transverse links are each arranged in vehicle longitudinal direction next to each other, and with a transverse leaf spring arrangement, which is connected to the two independent wheel suspensions.

13 Claims, 6 Drawing Sheets

(56) References Cited

U.S. PATENT DOCUMENTS

| | | | |
|---|---|---|---|
| 4,458,918 A | | 7/1984 | Rumpel |
| 4,614,359 A | | 9/1986 | Lundin et al. |
| 4,779,893 A | * | 10/1988 | Juechter ................ 280/124.145 |
| 4,969,634 A | * | 11/1990 | Bellingham .................... 267/52 |
| 5,062,620 A | * | 11/1991 | Martone ....................... 267/260 |
| 5,833,026 A | * | 11/1998 | Zetterstrom et al. .......... 180/360 |
| 6,189,904 B1 | * | 2/2001 | Gentry et al. .......... 280/124.175 |
| 6,530,587 B2 | * | 3/2003 | Lawson et al. ........... 280/124.17 |
| 6,832,773 B2 | * | 12/2004 | Yokoyama ............. 280/124.171 |
| 2011/0260424 A1 | | 10/2011 | Pollymeyer et al. |
| 2012/0049482 A1 | | 3/2012 | Lizot et al. |
| 2012/0161411 A1 | | 6/2012 | Ehrlich et al. |
| 2013/0099462 A1 | * | 4/2013 | Ehrlich et al. ......... 280/124.116 |

FOREIGN PATENT DOCUMENTS

| | | |
|---|---|---|
| EP | 0343891 A1 | 11/1989 |
| EP | 0760750 B1 | 10/2001 |
| FR | 2529839 A1 | 1/1984 |
| WO | 9600661 A1 | 1/1996 |

\* cited by examiner

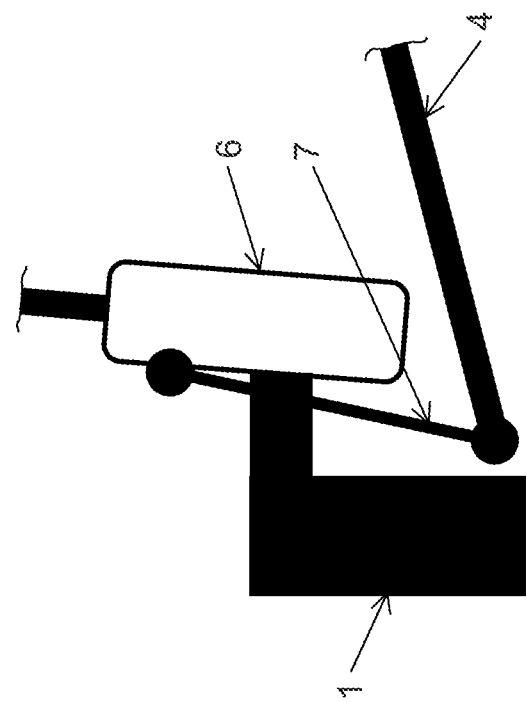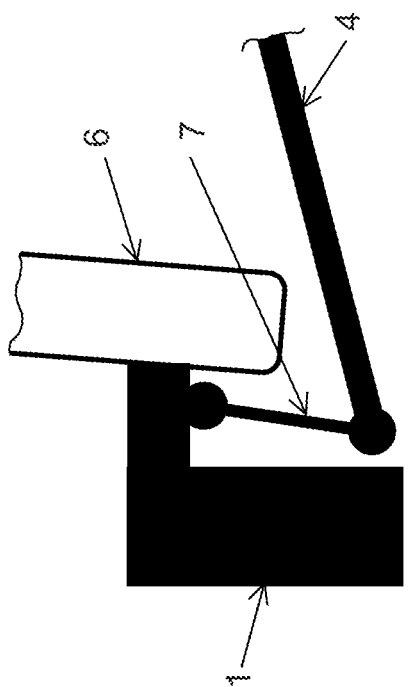

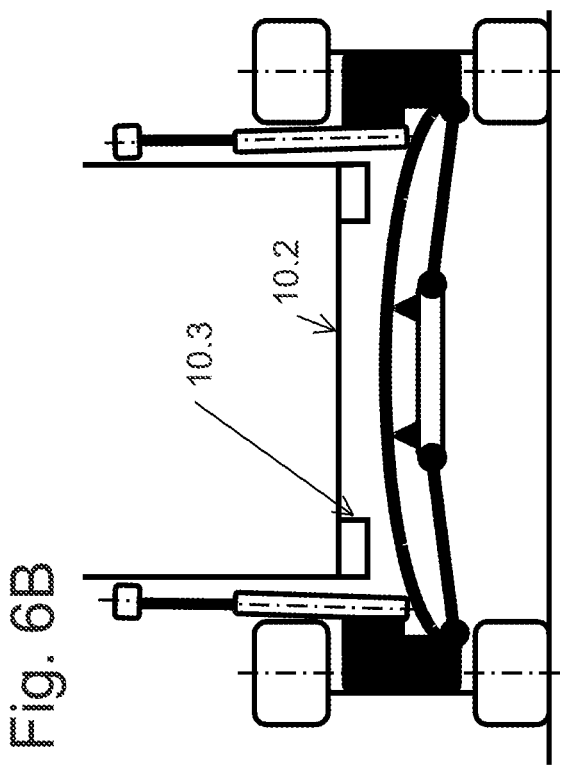
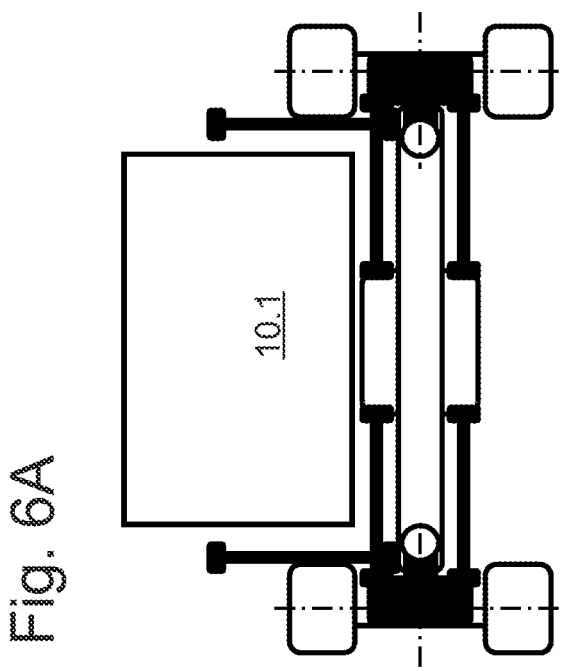

REAR AXLE FOR A MOTOR VEHICLE

CROSS-REFERENCE TO RELATED APPLICATION

This application claims priority to German Patent Application No. 10 2012 012 652.2, filed Jun. 25, 2013, which is incorporated herein by reference in its entirety.

TECHNICAL FIELD

The technical field relates to a rear axle for a motor vehicle and to a motor vehicle having such a rear axle.

BACKGROUND

From DE 10 2008 049 761 A1 a rear axle having two independent suspensions is known, in which a spring shock absorber strut is replaced with a transverse leaf spring in order to reduce the installation space required for spring elements. The independent wheel suspensions comprise an H-arm link with a longitudinal and a transverse link portion as well as an upper transverse link. The transverse leaf spring is arranged in vehicle vertical direction above the transverse link portion of the H-arm link and under the upper transverse link, and mounted in an auxiliary frame by means of rubber pads.

However, through the transverse leaf spring arranged in vehicle vertical direction above the transverse link portion of the H-arm link and in particular the upper transverse link arranged in vehicle vertical direction above the transverse leaf spring, installation space is still occupied. Mounting the straight transverse leaf spring by means of rubber pads produces a linear characteristic so that in particular for roll stabilization further measures may be required.

Therefore, at least one object is to avoid at least one of the above mentioned disadvantages. In addition, other objects, desirable features and characteristics will become apparent from the subsequent summary and detailed description, and the appended claims, taken in conjunction with the accompanying drawings and this background.

SUMMARY

A rear axle is provided for a motor vehicle, in particular of a passenger car, that comprises two independent wheel suspensions. Both independent wheel suspensions each have a wheel carrier for connecting a rear wheel of the motor vehicle and a three-link arrangement to a longitudinal link and two transverse links, which are each connected to the wheel carrier directly or indirectly, in an articulated manner, in particular via an intermediate element. At their end that is distant from the wheel carrier, the links can be connected to the motor vehicle, in particular to an (auxiliary) frame or the body. In an embodiment, a longitudinal link can extend at least substantially in vehicle longitudinal direction, a transverse link correspondingly at least substantially in vehicle transverse direction, wherein a reference to a vehicle longitudinal, transverse or vertical direction above and in the following can always relate in particular to an installation position of the rear axle.

According to an embodiment, a transverse leaf spring arrangement is connected to the two independent wheel suspensions and to a structure of the motor vehicle, in particular to an axle support or auxiliary frame or directly to the body. A transverse leaf spring arrangement can each have one or a plurality, in particular connected transverse leaf springs in vehicle vertical, transverse and/or longitudinal direction. For example, a transverse leaf spring arrangement in an embodiment can comprise a transverse leaf spring that is divided in vehicle transverse direction, i.e., comprise two or more transverse leaf springs in vehicle transverse direction. Additionally or alternatively, transverse leaf springs can be arranged in vehicle vertical and/or longitudinal direction on top of one another or next to one another into a transverse leaf spring assembly. Technically speaking, a transverse leaf spring is a beam-like, straight or bent element, the width of which is greater in vehicle longitudinal direction than its height in vehicle vertical direction, in particular at least twice, in particular at least four times the size, and the extension of which in vehicle transverse direction is at least ten times, in particular at least twenty times said width. A transverse leaf spring can comprise metal, in particular steel, and/or in particular fiber-reinforced plastic, preferentially glass and/or carbon fiber-reinforced plastic, in particular consist thereof.

In an embodiment, the transverse leaf spring arrangement can each be connected to a wheel carrier or a shock absorber strut of an independent wheel suspension in an articulated manner, in particular by way of a swing support. In a further development, the swing support can be connected to the wheel carrier and/or the shock absorber strut in a positively-joined manner or by means of a rigid body joint or by means of an elastomer bushing. A rigid body joint in particular can be a ball, universal or hinge joint and advantageously make available larger angle configurations than elastomer bushings. On the other hand, elastomer bushings can be more favorable than rigid body joints in terms of price and/or in terms of absorption.

Connecting the transverse leaf spring arrangement to or with a structure of the motor vehicle in this case also a mount or support for a more compact realization. In this regard, a transverse leaf spring arrangement connected with a structure of the motor vehicle can fixed or limited relative to this structure in vehicle longitudinal, transverse and/or vertical direction, in particular be movable between stops, on which it can support itself on one or both sides.

According to an embodiment, the two cross members of each independent wheel suspension are each arranged next to one another in vehicle longitudinal direction. In other words, the two transverse links of an independent wheel suspension are arranged next to one another in a top view in vehicle vertical direction, in particular, at least substantially in parallel.

Because of this, the space that is available above the rear axle on the one hand can be advantageously further increased in size, so that in a further development in particular a driveshaft arrangement, in particular a differential gear, can be arranged in vehicle vertical direction above the two transverse links arranged next to one another. Additionally or alternatively, an energy storage unit, in particular a fuel tank, in particular for LPG or CNG, a battery or an accumulator for supplying an electric propulsion drive of an electric or hybrid vehicle, or a foot or sitting space for vehicle occupants can be arranged above the two transverse links arranged next to one another.

Additionally or alternatively to this installation space enlargement above the transverse links through the arrangement of the two transverse links next to one another, a spring travel of the transverse leaf spring arrangement and/or a deflection travel of the transverse link can be advantageously enlarged when the transverse leaf spring arrangement is no longer arranged seen in vehicle vertical direction between the two transverse links.

In a further development, the two transverse links of an independent wheel suspension are arranged in vehicle longitudinal direction on both sides of the transverse leaf spring arrangement. This can advantageously protect the transverse leaf spring arrangement from falling rock and/or improve the dynamics since the transverse leaf spring arrangement can thereby be guided in the direction of its bending axis through the transverse links on both sides. Equally, it is also possible however to arrange the transverse leaf spring arrangement in vehicle longitudinal direction in front of or behind the transverse links of an independent wheel suspension which are then adjacent to one another.

In a further development, joints, in which the two transverse links of an independent wheel suspension are connected to the wheel carrier of said independent wheel suspension, are arranged, seen in vehicle vertical direction, at least substantially, at the same height. Additionally or alternatively, joints, with which these two transverse links are connected to the motor vehicle, can also be arranged at least substantially at the same height with respect to one another. In particular for design and/or driving dynamic reasons it can be equally advantageous to offset the joints of the two cross members of an independent wheel suspension on the wheel carrier and/or motor vehicle side in vehicle vertical direction with respect to one another, preferentially in such a manner that the two joints in vehicle vertical direction are arranged on the same side or on both sides of the transverse leaf spring arrangement.

According to an embodiment, the transverse leaf spring arrangement is connected to an independent wheel suspension in vehicle longitudinal direction, at least substantially at the height of a wheel center of the wheel carrier of such an independent wheel suspension. In this way, a vertical wheel force in particular can be favorably transmitted to the transverse leaf spring arrangement. A connection at the height of a wheel center in this case is to mean in particular a connection of the transverse leaf spring arrangement with the wheel carrier, in which the wheel center or a wheel axle is arranged through the wheel center in vehicle longitudinal and/or vertical direction within a face cross section of the leaf spring arrangement on a wheel carrier side.

According to an embodiment, the transverse leaf spring arrangement has a progressive characteristic. The characteristic can be unidirectionally progressive. Here, this means that the transverse leaf spring arrangement counters a deformation from an in particular non-deformed starting or reference state in a direction, for example a jounce of the motor vehicle, i.e., a movement in gravitational direction, with a spring force, which increases disproportionately with growing deformation. In other words, a gradient dF/dz of a relation of the spring force F to the deformation z increases monotonously, in particular strictly monotonously with the deformation:

$$d(dF/dz)/dz \geq 0.$$

In another embodiment, the characteristic is bidirectionally progressive. Accordingly, in this case, this means in particular that the transverse leaf spring arrangement counters a deformation from an in particular non-deformed starting or reference state in both directions, for example a jounce and rebound of the motor vehicle, i.e. a movement in and against the direction of gravity, with a spring force each, which increases disproportionately with growing deformation. Because of this, a roll movement can be advantageously stabilized when cornering. Accordingly, stabilizers, rebound buffer springs and the like can be omitted in a further development. The bidirectional, progressive characteristic can be due to the connection in an embodiment, i.e., result from the connection of the transverse leaf spring arrangement to or with the motor vehicle.

In general, according to a further embodiment, which can preferentially be combined with the adjacent arrangement of the two transverse links of an independent wheel suspension described above, a transverse leaf spring arrangement of a rear axle of a motor vehicle can be connected to a structure of this motor vehicle in such a manner that it has an in particular bidirectional, progressive characteristic. To this end, the structure of the motor vehicle, with which the transverse leaf spring arrangement is connected, can comprise in particular two surfaces which are convex with respect to each other, between which the transverse leaf spring arrangement can be arranged in vehicle vertical direction with or without play. During jounce, the transverse leaf spring arrangement supports itself on the one convex surface immediately or after a play has been used up, so that a growing supporting surface is obtained. Upon rebound, the transverse leaf spring arrangement immediately or after a play has been used up, supports itself on the other convex surface, so that a growing supporting surface is likewise obtained. During a roll, the transverse leaf spring arrangement supports itself on the two convex surfaces space in vehicle transverse direction. A convex surface in this case is a surface which, starting out from a vehicle or transverse leaf spring arrangement center, increasingly distances itself in vehicle transverse direction from a vehicle transverse axis, a centerline of the non-deformed transverse leaf spring arrangement and/or the surface of the structure located opposite. In an embodiment, a connection of the transverse leaf spring arrangement with a structure of the motor vehicle is acoustically insulated, in particular through an insulating layer connected in between.

BRIEF DESCRIPTION OF THE DRAWINGS

The present invention will hereinafter be described in conjunction with the following drawing figures, wherein like numerals denote like elements, and:

FIG. 3A is a connection of a transverse leaf spring arrangement of the rear axle of FIG. 1 with a wheel carrier of the rear axle according to an embodiment in a view corresponding to FIG. 1;

FIG. 3B is a connection of a transverse leaf spring arrangement of the rear axle of FIG. 1 with a wheel carrier of the rear axle according to a further embodiment in a view corresponding to FIG. 1, 3A;

FIG. 6A is a rear axle of a motor vehicle according to a further embodiment in a view corresponding to FIG. 2; and FIG. 6B is a rear axle of a motor vehicle according to a further embodiment in a view corresponding to FIG. 1.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
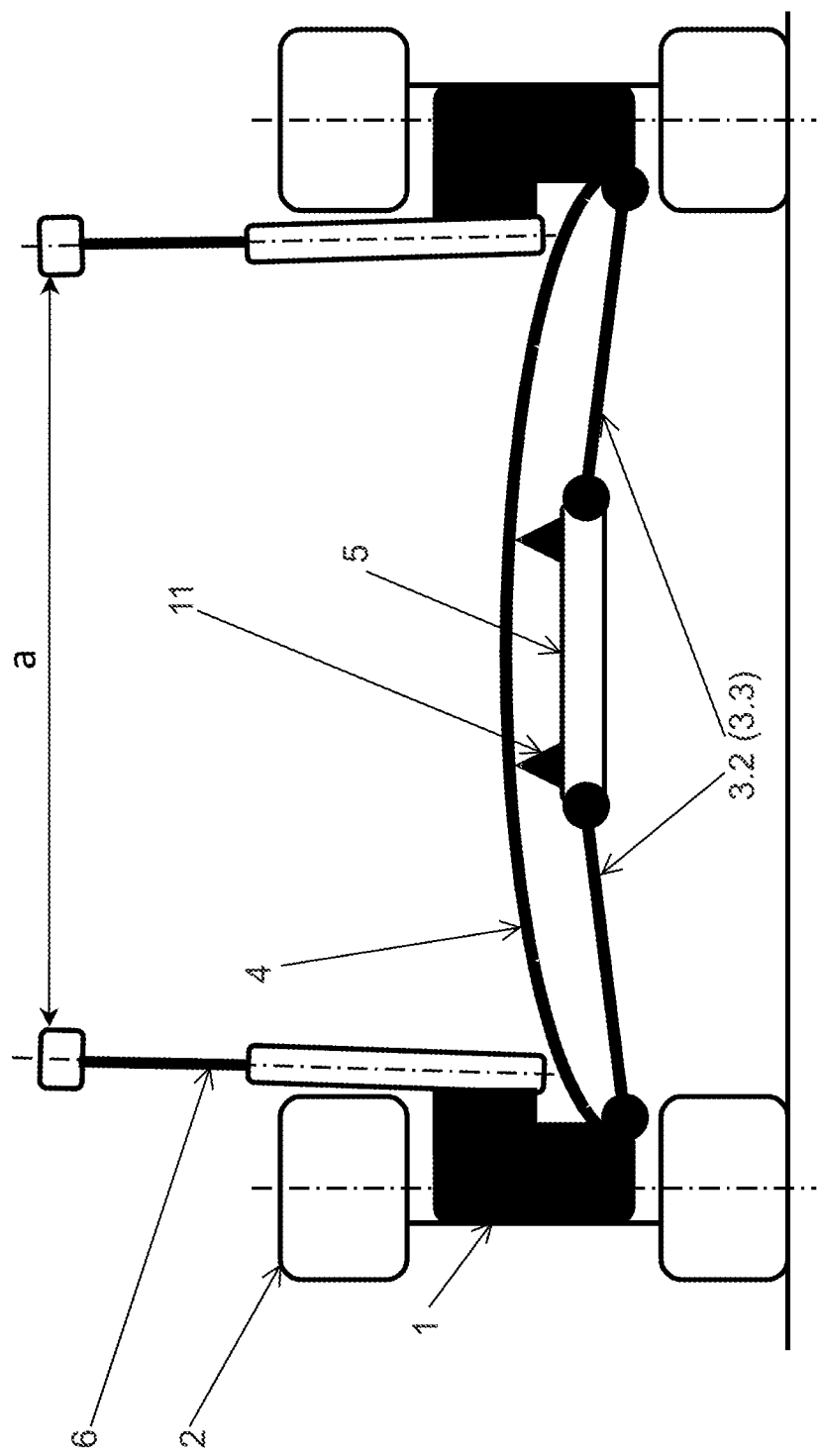
FIG. 1 is a rear axle of a motor vehicle according to an embodiment in a view from the back in vehicle longitudinal direction.
Figure 2:
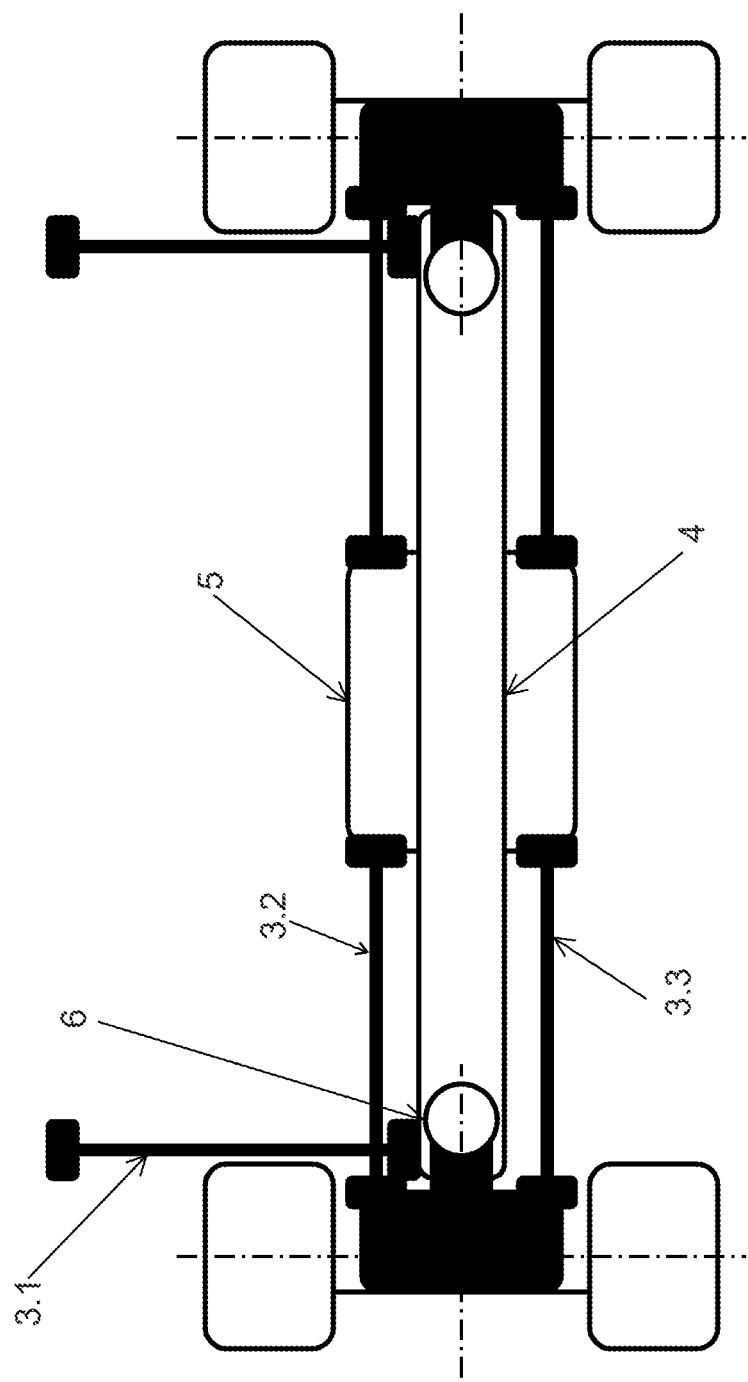
FIG. 2 is the rear axle of FIG. 1 in a top view in vehicle vertical direction from above.

FIG. 1 and FIG. 2 show a rear axle of a motor vehicle in a view in vehicle longitudinal direction from the rear (FIG. 1) or in a top view in vehicle vertical direction from above (FIG. 2) according to an embodiment. The rear axle comprises two independent wheel suspensions (left, right in FIG. 1, FIG. 2) which, at least substantially, are formed mirror-symmetrically so that in the following only the independent wheel suspension on the left in the figures is discussed in more detail and reference is made to this regarding the independent wheel suspension on the right.

The independent wheel suspensions each comprise a wheel carrier 1 with a wheel bearing (not shown) for the connection of a rear wheel 2. A three-link arrangement is connected to each wheel carrier 1 in an articulated manner, which in the Figures in indicated by filled-out circles in viewing direction of an axis of rotation of the joints (see FIG. 1) or cylinders in viewing direction perpendicularly thereto (see FIG. 2). Each three-link arrangement comprises a longitudinal link 3.1 and two transverse links 3.2, 3.3, as is evident in particular in the top view of FIG. 2, the two transverse links 3.2, 3.3 are arranged in vehicle longitudinal direction (vertical in FIG. 2) next to one another.

The rear axle furthermore comprises a transverse leaf spring arrangement with a transverse leaf spring 4, which is connected to the two independent wheel suspensions. In FIG. 1, an acoustically insulated connection 11 to an axle support or auxiliary frame 5 is schematically indicated.

As is evident in particular in FIG. 2, the two cross members 3.2, 3.3 of an independent wheel suspension are arranged in vehicle longitudinal direction on both sides of the transverse leaf spring arrangement 4. In vehicle longitudinal direction or in the top view of FIG. 2, the transverse leaf spring arrangement 4 is connected to an independent wheel suspension at the height of a wheel center of the wheel carrier 1 of the independent wheel suspension. In particular, the wheel axis of the wheel carrier, which is indicated in dash-dotted line in FIG. 2, is located in vehicle longitudinal direction within the face cross section (left in FIG. 2) of the transverse leaf spring arrangement 4 on the wheel carrier side.

The joints, in which the two transverse links 3.2, 3.3 of an independent wheel suspension are connected to the wheel carrier 1 of this independent wheel suspension are arranged in vehicle vertical direction at the same height, which is evident in particular from FIG. 1, in which the joints located at the back in vehicle longitudinal direction are obscured by the joints located in vehicle longitudinal direction in the front. The same applies to the joints with which the transverse links 3.2, 3.3 are connected to the axle support 5 of the motor vehicle.

On the independent wheel suspensions of the rear axle, a shock absorber strut 6 is fastened in an articulated manner, which, located opposite, supports itself on the motor vehicle in a support bearing. The shock absorber struts 6 are substantially parallel to the vehicle vertical direction (vertical in FIG. 1), so that an installation or intermediate space above the rear axle is advantageously increased in size.

The transverse leaf spring arrangement 4 in an embodiment, which is partly shown in FIG. 3A, is connected to the wheel carrier 1 via a swing support 7 in an articulated manner. In an alternative embodiment, which is partly shown in FIG. 3B, the transverse leaf spring arrangement 4 is connected to the shock absorber strut 6 via a swing support 7 in an articulated manner.

Figure 4A:
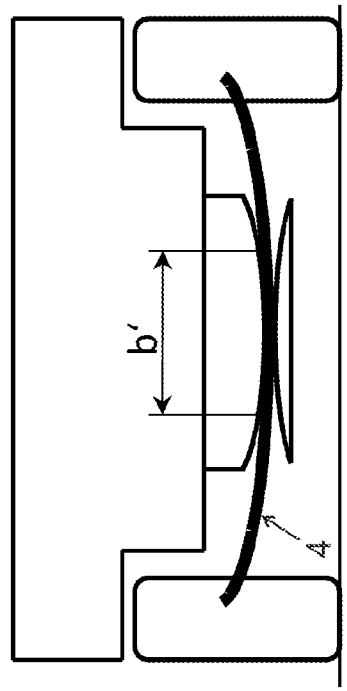
FIG. 4A is the motor vehicle of FIG. 1 with non-deformed transverse leaf spring arrangement in a view corresponding to FIG. 1.
Figure 4B:
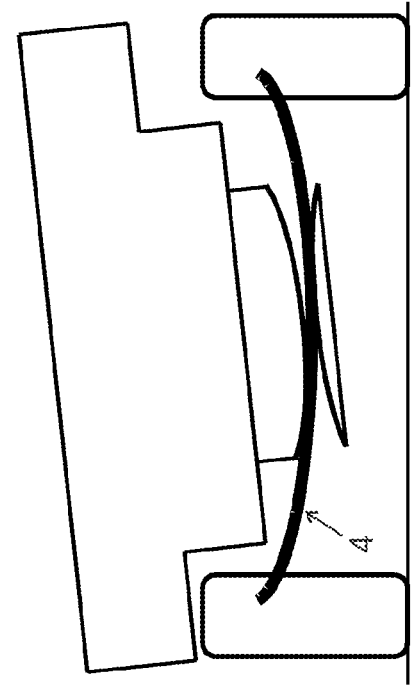
FIG. 4B is the motor vehicle of FIG. 4A in the parallel jounce state.
Figure 4C:
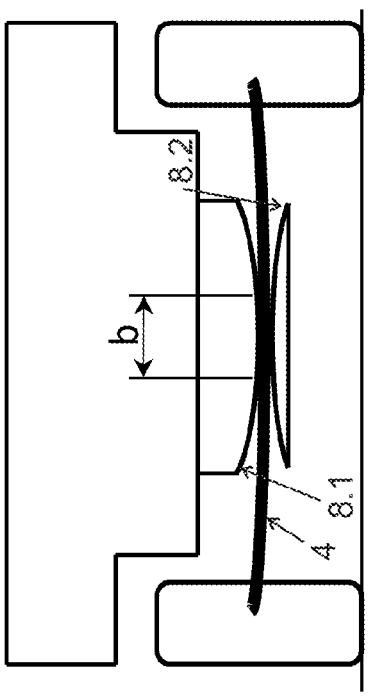
FIG. 4C is the motor vehicle of FIG. 4A in the parallel rebound state.
Figure 4D:
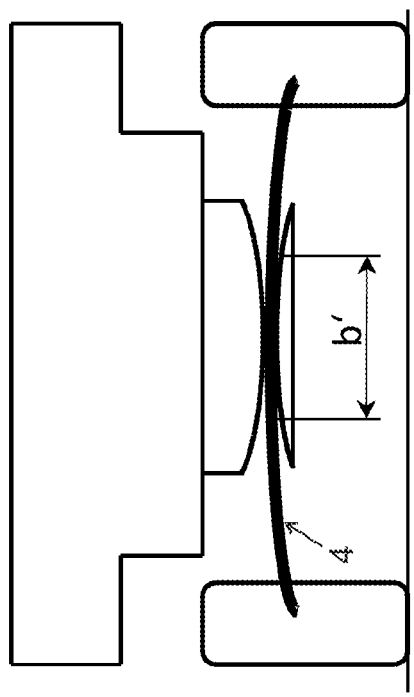
FIG. 4D is the motor vehicle of FIG. 4A in a roll state.

The transverse leaf spring arrangement has a progressive characteristic due to the connection. To this end, the transverse leaf spring arrangement is connected to a structure of the motor vehicle in such a manner that it has a bidirectional progressive characteristic. To this end, the structure has two surfaces 8.1, 8.2 that are convex with respect to each other, between which the transverse leaf spring arrangement 4 is arranged, as is evident in FIG. 4A. In a non-deformed or reference state, the transverse leaf spring arrangement 4 can bear against one or both surfaces 8.1, 8.2 or be spaced there from with play. Upon a parallel jounce in the direction of gravity (downwards in FIG. 4B), a supporting surface b→b' of the transverse leaf spring arrangement 4 on the in the direction of gravity upper surface 8.1 is enlarged if applicable after using up of a play, so that the spring force during jounce increases progressively. During a parallel rebound against the direction of gravity (upwards in FIG. 4C), a supporting surface b→b' of the transverse leaf spring arrangement 4 on the in direction of gravity lower surfaces 8.2 is increased in size if applicable after a play has been used up, so that the spring force during rebound likewise increases progressively. In a roll state shown in FIG. 4D, the transverse leaf spring arrangement 4 supports itself spaced in vehicle transverse direction (horizontally in FIG. 4D) on the upper and lower surface 8.1, 8.2 and thus improves the handling of the motor vehicle.

Figure 5:
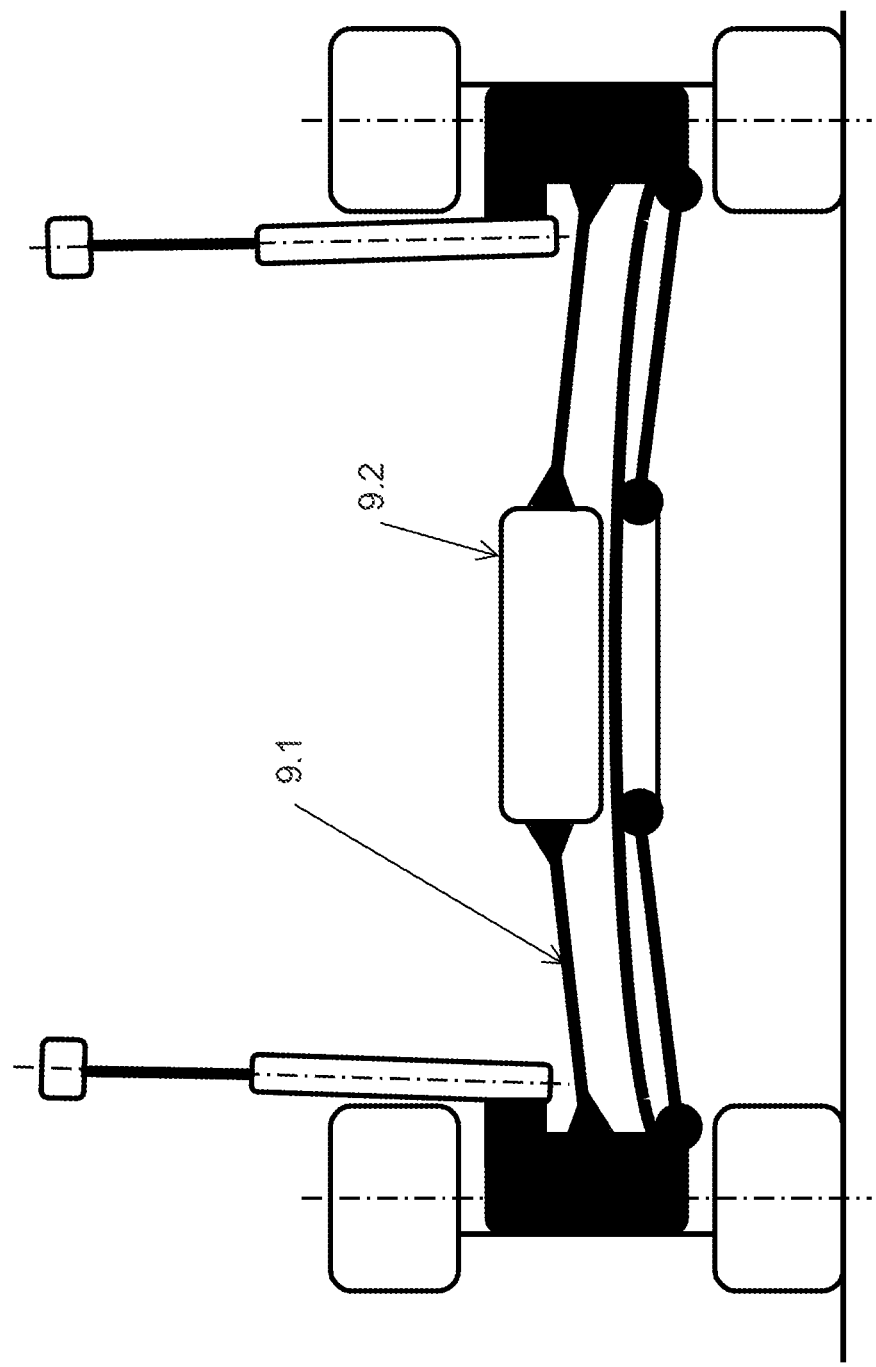
FIG. 5 a rear axle of a motor vehicle according to a further embodiment in a view corresponding to FIG. 1.

FIG. 5 shows a driven rear axle of a motor vehicle according to a further embodiment in a view corresponding to FIG. 1 with a driveshaft arrangement connected to the wheel carriers for driving rear wheels connected to the wheel carriers, which comprise driveshafts 9.1 as well as a differential gear 9.2, which in vehicle vertical direction or the top view of FIG. 2 is arranged above the axle support 5 and the transverse leaf spring arrangement 4.

FIG. 6A, 6B show rear axles of a motor vehicle according to further embodiments of the present invention in a view corresponding to FIG. 2 and FIG. 1 respectively, in which in vehicle longitudinal direction in front of the axle support 5 an energy storage unit 10.1 and in vehicle vertical direction above the axle support 5 respectively a lowered loading floor 10.2 and a body longitudinal frame 10.3 are arranged.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:
1. A rear axle for a motor vehicle comprising,
a first wheel suspension; and
a second wheel suspension that is independent of the first wheel suspension,
wherein the first wheel suspension and the second wheel suspension each comprise a wheel carrier, and
a three-link arrangement connected in an articulated manner to the wheel carrier with a longitudinal link and two transverse links, wherein the two transverse links are each arranged in a vehicle transverse direction next to one another;

a transverse leaf spring arrangement that is connected to the first wheel suspension and the second wheel suspension independently of the transverse links; and a swing support connecting the transverse leaf spring arrangement to a shock absorber strut in an articulated manner.

2. The rear axle according to claim 1, wherein the two transverse links are arranged on both sides of the transverse leaf spring arrangement.

3. The rear axle according to claim 1, further comprising joints connecting the wheel carrier to the two transverse links, wherein the joints are arranged in a vehicle vertical direction at least substantially at the same height.

4. The rear axle according to claim 1, wherein the transverse leaf spring arrangement comprises a connected transverse leaf spring of metal.

5. The rear axle according to claim 1, wherein the transverse leaf spring arrangement comprises a progressive characteristic.

6. The rear axle according to claim 1, further comprising a driveshaft arrangement connected to the wheel carrier for driving rear wheels connected to the wheel carrier.

7. The rear axle according to claim 1, wherein the motor vehicle is a passenger vehicle.

8. The rear axle according to claim 1, wherein the swing support is connected with an elastomer bushing to the shock absorber strut.

9. The rear axle according to claim 1, wherein the transverse leaf spring arrangement comprises steel.

10. The rear axle according to claim 1, wherein the transverse leaf spring arrangement comprises a fiber-reinforced plastic.

11. A motor vehicle, comprising:
   a first wheel suspension; and
   a second wheel suspension that is independent of the first wheel suspension,
   wherein the first wheel suspension and the second wheel suspension each comprise:
      a wheel carrier;
      a three-link arrangement connected in an articulated manner to the wheel carrier, the three-link arrangement comprising:
         a longitudinal link; and
         two transverse links arranged in a vehicle transverse direction next to one another;
   a transverse leaf spring arrangement that is connected to the first wheel suspension and the second wheel suspension independently from the transverse links; and
   a swing support connecting the transverse leaf spring arrangement to a shock absorber strut in an articulated manner.

12. The motor vehicle, according to claim 11, wherein the transverse leaf spring arrangement is connected to a structure of the motor vehicle in such a manner to provide a progressive characteristic.

13. The motor vehicle according to claim 12, wherein the structure of the motor vehicle comprises two surfaces that are convex with respect to each other, between which is arranged the transverse leaf spring arrangement.

\* \* \* \* \*